May 27, 1924.
J. E. DAVIS
1,495,251
MACHINE FOR COATING THE INTERIOR OF EDIBLE CONTAINERS
Filed June 6, 1922 2 Sheets-Sheet 1
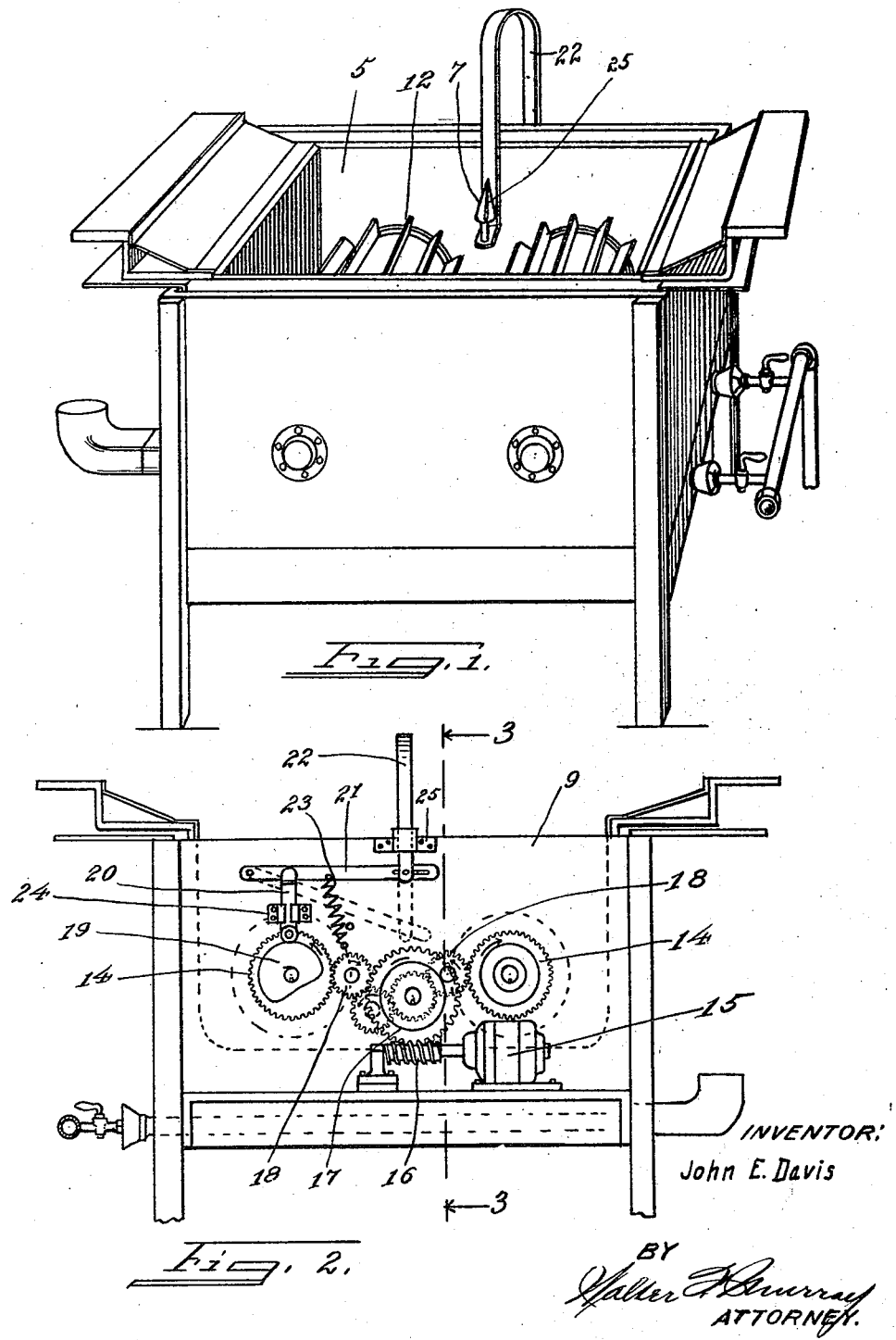
INVENTOR:
John E. Davis
BY
ATTORNEY.

May 27, 1924.

J. E. DAVIS 1,495,251

MACHINE FOR COATING THE INTERIOR OF EDIBLE CONTAINERS

Filed June 6, 1922     2 Sheets-Sheet 2

INVENTOR:
John E. Davis

BY *Walter F. Murray*
ATTORNEY.

Patented May 27, 1924.

1,495,251

UNITED STATES PATENT OFFICE.

JOHN E. DAVIS, OF CINCINNATI, OHIO.

MACHINE FOR COATING THE INTERIOR OF EDIBLE CONTAINERS.

Application filed June 6, 1922. Serial No. 566,392.

*To all whom it may concern:*

Be it known that I, JOHN E. DAVIS, a citizen of the United States of America, and a resident of Cincinnati, in the county of Hamilton and State of Ohio, have invented a new and useful Machine for Coating the Interior of Edible Containers, of which the following is a specification.

An object of my invention is to provide a device to be employed in coating the interior of containers of ice cream with an edible substance in the nature of chocolate, icing, etc., such as is disclosed in my co-pending application, Serial No. 560,214, filed May 11, 1922.

Another object of my invention is to provide a simple and efficient device for the purpose stated.

These and other objects are attained by means described herein, and disclosed in the accompanying drawing, in which;

Fig. 1 is a perspective view of a device embodying my invention.

Fig. 2 is a longitudinal side elevation of the device shown in Fig. 1.

Figure 3:
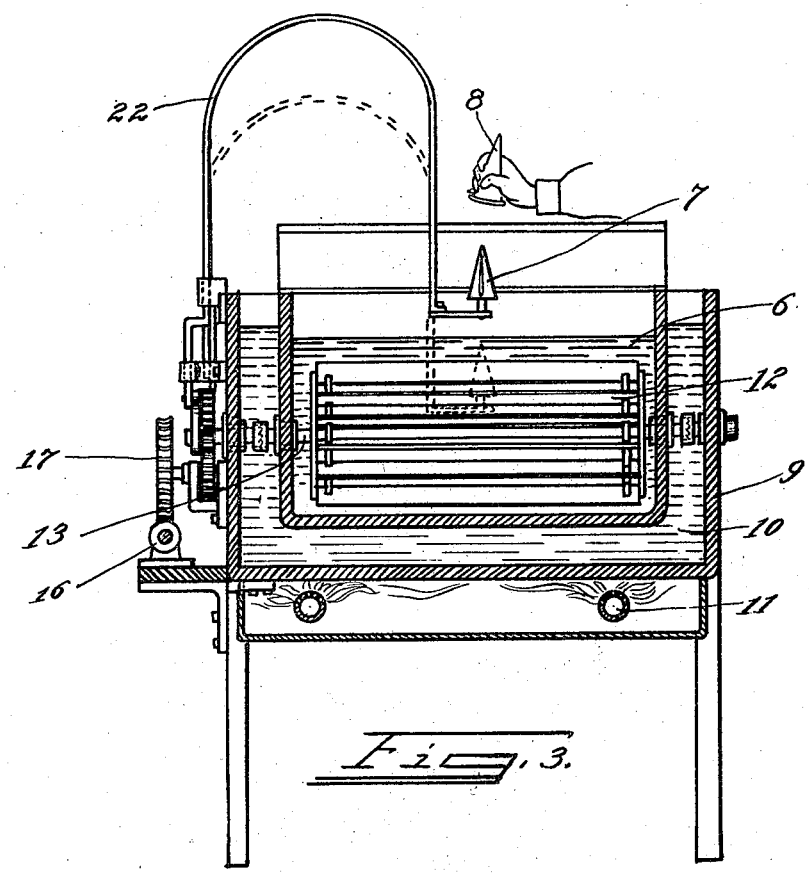
Fig. 3 is a sectional view on line 3—3 of Fig. 2.
Figure 4:
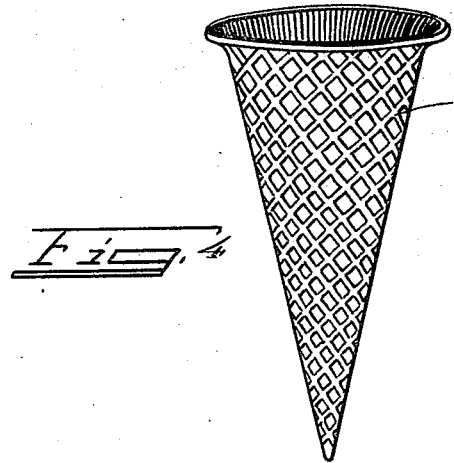
Fig. 4 is a perspective view of a cone such as is coated by means of a machine embodying my invention.

The device of my invention comprises primarily a suitable tank 5 within which an edible substance such as chocolate, icing, etc., 6, may be contained, and into which a form 7 is dipped, whereupon the form is lifted from the coating substance 6. A cone 8 is then inverted over the form 7 and the coating substance carried by the form 7 adheres to the inner wall of the cone, whereupon the cone is withdrawn from the form. Any suitable means to agitate the coating substance 6 and to alternately carry the form 7 into and from the substance 6 may be employed. I have shown a conventional mechanism whereby this may be accomplished. An outer tank 9 contains water 10 which is heated by means of suitable burners 11. The tank 5 containing the coating substance 6 extends into the water 10 whereby the coating substance is retained in a liquid state. Suitable agitators such as paddles 12 are employed to avoid precipitation of the heavy particles of the coating substance, and motion may be imparted to the paddles by any suitable means such as by mounting the paddles upon shafts 13 carrying gears 14 driven from a motor 15 by a suitable train of gears. The train of gears may be driven by a suitable worm 16 operative upon a worm wheel 17 which worm wheel in turn drives gears 18 in engagement with the gears 14. The one gear 14 carries a cam 19 which is engaged by a roller revolubly mounted on a sliding arm 20, the upper end of which arm is pivotally connected with a lever 21. One end of the lever is pivotally mounted upon the tank 9 or the frame thereof, and the other end of the lever engages at one end a U shaped bar 22 which extends over and above the coating fluid 6, and which may be vertically reciprocated, whereby the form 7 carried by the bar 22 may be alternately immersed in and raised above the coating substance 6. A suitable spring 23 yieldingly retains the roller carried by the arm 20 in engagement with the cam 19. The arm 20 and the bar 22 extends slidably thru suitable brackets 24 and 25 respectively.

In the operation of my device the coating substance is kept in a liquid state and in suspension by the action of the burners and the paddles. The form 7 is alternately immersed in and raised from the coating substance. When the form is held above the coating substance by the engagement of the arm 20 upon the arcuate portion of the cam, an operator places a cone 8 over the form and then withdraws the cone from the form. The parts bear a relation such that the form is held above the coating substance for a period of time sufficient to permit an operator to place an object such as the cone 8 over the form and to withdraw the object from the form before the form is again immersed in the coating substance. Form 7 may have a groove 25 for relieving the vacuum tendency when removing the cone 8.

What I claim is:

1. In a device for coating the interior wall of edible containers the combination of means for receiving a coating substance, and means for alternate immersement in the coating substance carried by the first mentioned means and for entry into the edible container for applying coating substance to the interior wall of said container.

2. In a device of the class described the combination of a tank for containing a coating substance, and means for immersement in the coating substance for receiving a quantity of coating substance and for entry into an edible container for applying coating substance to the inner wall of the edible container.

3. In a device of the class described the combination of a tank for containing a coating substance, means for immersement in the coating substance for receiving a quantity of coating substance and for entry into an edible container for applying coating substance to the inner wall of the edible container, and means for agitating the coating substance within the tank.

4. In a device of the class described the combination of a tank for containing a coating substance, means within the tank for agitating the substance, a form for entry into an edible container, and means for alternately raising and lowering the form from and into the coating substance for applying the coating substance to the inner wall of an edible container.

5. In a device of the class described the combination of a pair of tanks, one tank contained within the other, the inner tank adapted to receive a coating substance and the outer tank adapted to receive a substance for controlling the temperature of the inner tank and the coating substance therein, means for agitating the coating substance, a form for entry into edible containers for coating the inner walls of the containers and means for alternately lowering the form into the coating material and raising the form from the coating material for applying the coating substance to the inner wall of the containers.

In testimony whereof, I have hereunto subscribed my name this 29th day of May, 1922.

JOHN E. DAVIS.